Oct. 17, 1967   F. H. UMBERG ETAL   3,348,042
FLEXIBLE, LIGHT-IMPERVIOUS, FLUID-TIGHT X-RAY FILM PACK
Filed Feb. 10, 1965   3 Sheets-Sheet 1
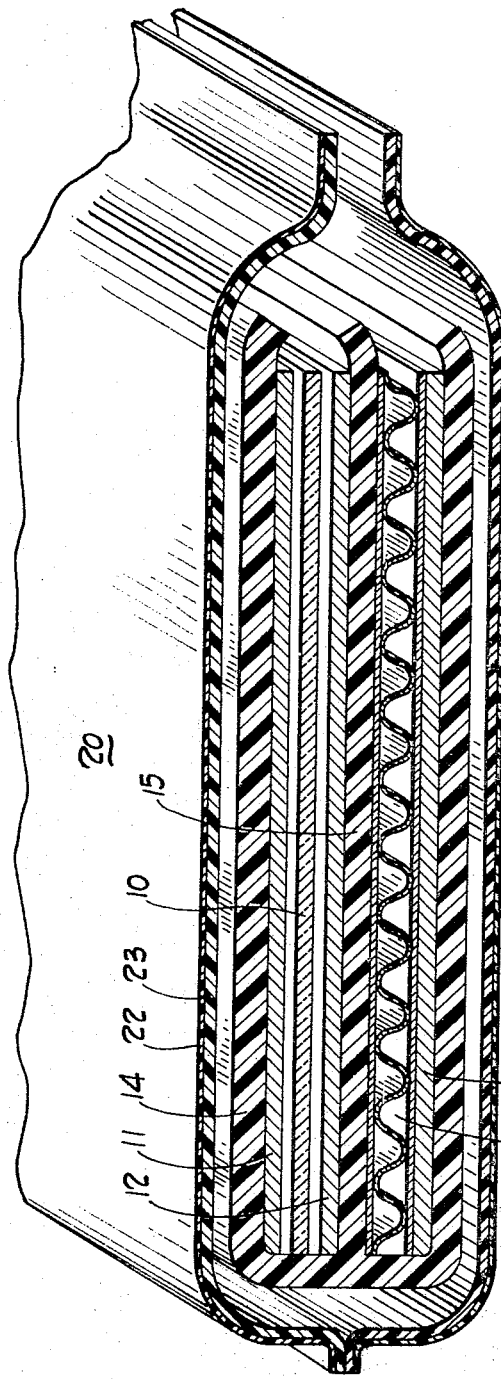
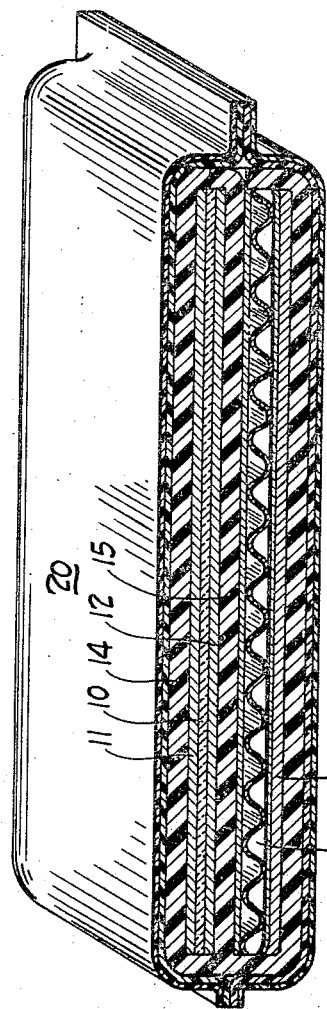
INVENTORS.
FRANK H. UMBERG AND
BY CECIL K. BRIDGEMAN
*Watts & Fisher*
ATTORNEYS.

Oct. 17, 1967   F. H. UMBERG ETAL   3,348,042
FLEXIBLE, LIGHT-IMPERVIOUS, FLUID-TIGHT X-RAY FILM PACK
Filed Feb. 10, 1965   3 Sheets-Sheet 2
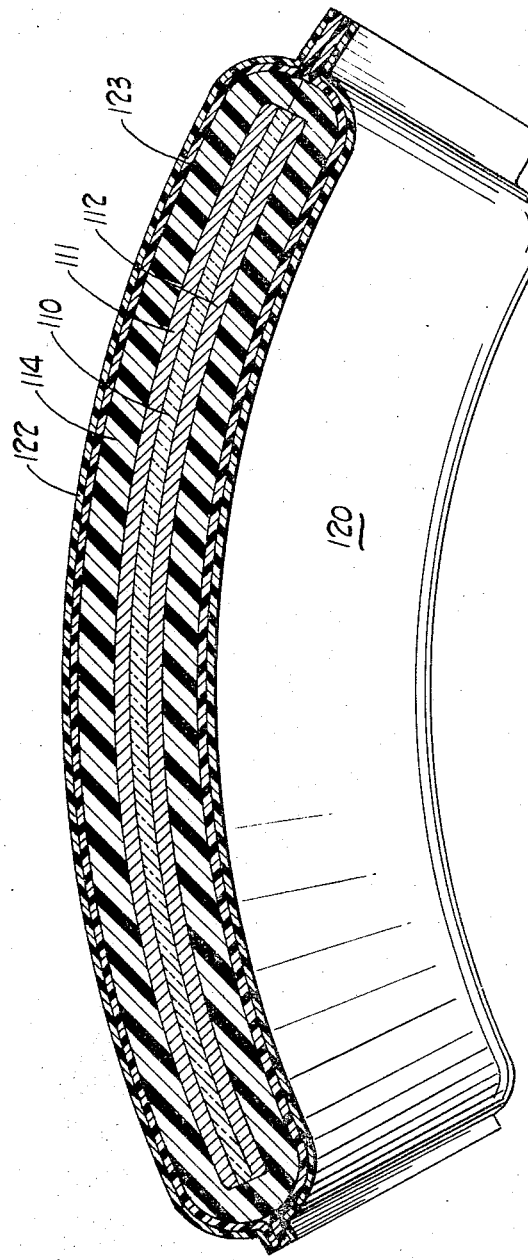
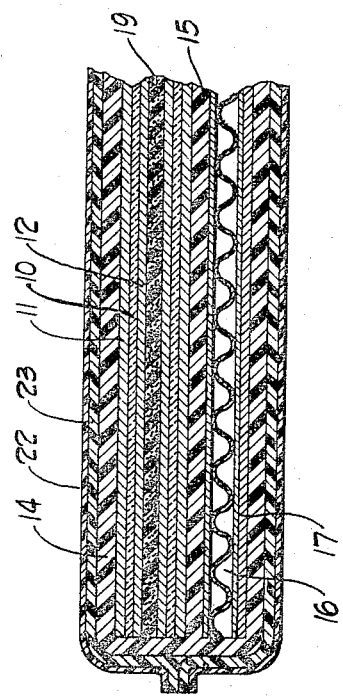
INVENTORS.
FRANK H. UMBERG AND
BY CECIL K. BRIDGEMAN
Watts & Fisher
ATTORNEYS.

Oct. 17, 1967   F. H. UMBERG ETAL   3,348,042
FLEXIBLE, LIGHT-IMPERVIOUS, FLUID-TIGHT X-RAY FILM PACK
Filed Feb. 10, 1965   3 Sheets-Sheet 3

INVENTORS
FRANK H. UMBERG AND
BY CECIL K. BRIDGEMAN

*Watts & Fisher*

ATTORNEYS

United States Patent Office 3,348,042
Patented Oct. 17, 1967

3,348,042
FLEXIBLE, LIGHT-IMPERVIOUS, FLUID-TIGHT X-RAY FILM PACK
Frank H. Umberg, Montreal, Quebec, and Cecil K. Bridgeman, Islington, Ontario, Canada, assignors to Picker X-Ray Mfg. Limited, Rexdale, Canada
Filed Feb. 10, 1965, Ser. No. 433,251
18 Claims. (Cl. 250—68)

ABSTRACT OF THE DISCLOSURE

An X-ray film pack in which a sheet of X-ray film, intensifying screens and a stiffening member wrapped in a cover are sealed within an evacuated, two-ply, plastic envelope that is flat or pre-curved. Open spaces in the stiffening member form a reservoir for residual air or leakage air. The pack is automatically evacuated and sealed in a vacuum box.

---

This invention relates to X-ray film packs and more particularly to an evacuated film pack for holding X-ray film and intensifying screens in complete surface contact with each other.

X-ray film has emulsion on both surfaces of a substrate. This emulsion is sensitive to both light and X-radiations. With studies where relatively little energy is required, such as in radiographing a hand, the operator may rely on the X-ray sensitivity alone. Where greater amounts of energy are required, as when an abdomen is radiographed, reliance on X-radiation alone requires excessive amounts of energy. Accordingly, fluorescent or electron emissive intensifying screens are normally used with X-ray film during most exposures. The intensifying screens emit light or electron energy in response to X-rays and intensify the image formed on the film. For maximum resolution, these screens must be maintained in intimate contact with the film during exposure to X-rays. Normally, an intensifying screen is placed on each side of a sheet of the double-coated X-ray film and the film and screens are loaded into a light-tight film holder known as a cassette. The purpose of the cassette is to protect the X-ray film from exposure to light and to maintain the intensifying screens in close contact with the film.

Cassettes that are now available have many shortcomings. Many embody arrangements of clips and other fasteners to permit loading while thereafter maintaining the container light-tight. Most utilize arrangements of springs and pressure plates to maintain the intensifying screens in contact with the film. These may fail to adequately maintain uniform pressure. Furthermore, such known film holders are generally bulky, expensive, and difficult to load and unload, particularly in the dark. The present invention provides a film pack that overcomes the above disadvantages and provides further desirable features.

In accordance with the present invention, a sheet of X-ray film with an intensifying screen adjacent each surface is placed within a flexible, X-ray-transparent, light-opaque, fluid-tight, heat-sealable bag or pouch. The bag is then evacuated and heat sealed. The fluorescent intensifying screens are pressed tightly and uniformly against the sheet of X-ray film by the atmospheric pressure that is applied equally over the entire flexible bag. The bag is suitably constructed of tear-resistant, transparent polyester film outer ply and a light-opaque, thermoplastic, bondable inner ply.

For convenience in assembly, the sheet of film is first sandwiched between the two intensifying screens. The screens are wrapped in a folded covering to protect the screens and to hold the sandwich together during handling. A stiffener, such as corrugated cardboard, is positioned adjacent the screens and film within the flexible bag to hold the film flat. Ideally, the stiffener is both compressible and porous or chambered so that when the flexible outer bag is evacuated, the stiffener will be compressed and the pores or chambers will be evacuated. Thus, in the event of a small leak in the outer bag, the open spaces in the stiffener will form a reservoir for air that enters the bag. Furthermore, the stiffening member will also expand to compensate for increased volume occasioned by leakage, thereby keeping the package tight.

Where desired, an X-ray shield is included within the flexible bag. Conveniently, this may consist of a lead coating on the stiffening member. Such a shield prevents back scatter of the X-rays and permits a plurality of X-ray film packs to be stacked for automatic use in an X-ray machine where subsequent packs are positioned directly behind the film pack being exposed.

Evacuated X-ray film packs are formed in accordance with this invention by first placing a sheet of film between or adjacent one or more intensifying screens. These elements are wrapped with a flexible covering to form a subassembly and are inserted along with a stiffener, such as a sheet of cardboard, into the flexible outer bag. The flexible outer bag is then evacuated and heat sealed to prevent the subsequent entrance of air. Conveniently, the film pack may be evacuated and heat sealed in a vacuum box. The outer bag containing the assembled contents is placed within the vacuum box with the open end of the bag between two heat sealing jaws. The evacuation of the vacuum box evacuates the outer bag of the film pack, and the sealing jaws are then actuated to close the opening of the film pack bag. The jaws are heated to seal the opening.

By omitting the stiffening element, the film pack of this invention may be formed to a curved shape. This is accomplished by assembling and maintaining the outer bag and contents in the vacuum box while the bag is evacuated and heat sealed. The pack is then bent to the desired shape and will remain in the curved configuration because of the friction of the parts which are kept in tight relationship by atmospheric pressure exerted on the flexible bag. In this manner, film packs may be shaped to conform with the contour of curved portions of the body. This provides closer positioning of the film with respect to a curved object, thereby providing a sharper image.

Other attendant advantages and features of this invention will be readily appreciated as the same become better understood by the reference to the following detailed description when considered in connection with the accompanying drawings in which:

FIGURE 1 is a diagrammatic, partial view, in perspective, with parts in section of the film pack of the present invention showing the elements of the film pack in spaced relationship for clarity, and illustrating the outer bag prior to sealing;

FIGURE 2 is a partial view, in perspective, with parts in section showing the vacuum film pack of the present invention after the outer container has been evacuated and sealed;

FIGURE 3 is a diagrammatic, partial, perspective view, with parts in section, of another embodiment of the vacuum film pack of the present invention, showing a curved pack formed from flexible elements;

FIGURE 6 is a diagrammatic, partial, sectional view of another embodiment of this invention for holding a plurality of films.

Figure 4:
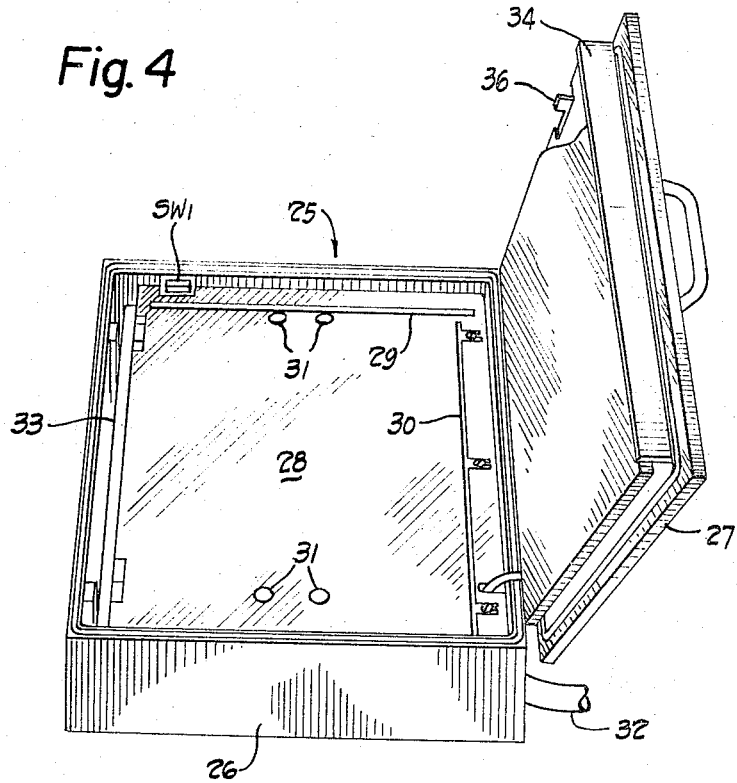
FIGURE 4 is a perspective view of a vacuum box for evacuating and heat sealing a vacuum film pack constructed in accordance with the present invention.

Referring now to FIGURES 1 and 2, a sheet of X-ray film 10 is sandwiched between two fluorescent intensifying screens 11 and 12. These three elements are enfolded or wrapped in an X-ray transparent, protective, covering 14, such as a sheet of polyvinyl chloride. A sheet of polyvinyl chloride of a thickness of approximately 12 mills performs satisfactorily. The X-ray film 10 and the intensifying screens 11 and 12 are substantially identical in shape and area. The protective covering 14 is approximately the same width as the film, but slightly greater than twice as long. The covering is folded in half to cover the outer surfaces of the intensifier screens and extends beyond the screens along the edge opposite the fold to facilitate handling of the subassembly. To facilitate reuse, the screens 11 may be bonded to the covering 14.

A sheet of stiff material, preferably porous or chambered and somewhat compressible, such as a sheet of corrugated cardboard 16, is positioned adjacent one surface of the enwrapped film and intensifier screens. The sheet of cardboard 16 is of the same shape and area as the sheet of X-ray film 10. By way of example, it has been found that a sheet of corrugated cardboard 3/16 inch thick provides the desired rigidity and compressibility, while providing chambers that function as vacuum reservoirs. One surface of the sheet of corrugated cardboard 16 is, for certain applications, covered with a coating, such as a lead sheet 17, that is substantially impervious to X-rays. Such a shield serves to prevent back-scatter of X-rays that have passed through the X-ray film 10. The lead sheet 17 is adhered to the sheet of cardboard 16 by an adhesive. For ordinary use, a sheet of lead 0.005-inch thick is generally satisfactory. However, where the film pack is to be used in a stack where the subsequent film packs to be exposed are placed directly behind the film pack that is being irradiated, a somewhat thicker coating of lead is desirable. Preferably the covering 14 includes a pocket 15 which holds the stiffener 16 so that the two may be reused as a unit.

An outer bag or pouch 20 envelops the sheet of cardboard and enwrapped sheet of film and fluorescent intensifying screens. The bag 20 has one open end 21 through which the contained elements are inserted and from which the air within the bag 20 is subsequently evacuated. The bag 20 is formed of two plys, an outer ply 22 and an inner ply 23 where it is desired to hold vacuum for a period of time. The outer ply 22 is formed of a flexible, fluid-tight, tear-resistant and X-ray-transparent material. The preferred material for the outer ply is a sheet of polyester film. Suitably, the polyester film is a polyethylene glycol ester of terephthalic acid. That is, the polyester film is polymerized polyethylene glycol ester. This material is sold commercially by the Du Pont de Nemours Company under the trademark Mylar. The inner ply 23 is adhered to the outer ply 22 and forms a light-opaque lining, preferably black, that is flexible, transparent to X-rays, thermoplastic and capable of being heat sealed, i.e., forming a bond. Polyethylene sheet is an inexpensive chemical that is exceptional for this use. An outer ply of Mylar of a thickness between 0.5 to 0.75 mill and an inner ply of polyethylene of a thickness of approximately 3 mills provides a satisfactory outer bag 20. For manual use where the vacuum is not maintained for protracted periods, a 6-mill black polyethylene bag is employed.

Processes for fabricating the outer bag 20 are known per se. It will be readily apparent to those skilled in the art that the polyethylene inner ply may be heat-adhered to the outer Mylar ply by feeding sheets of the two materials between heated rotary laminating rolls that soften the polyethylene and effect a bond. Bags may thereafter be formed by folding a piece of the two-ply material and heat sealing two of the three open edges.

FIGURE 2 illustrates the outer bag 20 and the contained sheet of film 10, intensifier screens 11 and 12, the protective wrapping 14, stiffening element 16 and a radiation shield 17, after the outer bag 20 has been evacuated and the opening 21 has been heat sealed. Atmospheric pressure, pressing equally on all surfaces of the flexible bag 20, maintains all of the contained elements within the bag 20 in tight, intimate contact with each adjacent element.

A curved film pack constructed in accordance with the present invention is shown in FIGURE 3 of the drawings. This embodiment is constructed similarly to the embodiment of FIGURES 1 and 2, but the stiffening element 16 has been omitted. Thus, a sheet of X-ray film 110 is sandwiched between two intensifying screens 111, 112 and wrapped in a protective covering 114. The protective covering 114 and the enwrapped film and intensifying screens are sealed within an evacuated outer bag 120 that has an outer ply 122 and an inner ply 123 as described in the previous embodiment. Although the outer bag 120 and the elements contained therein are all flexible, the assembled and evacuated film pack is maintained in curved position because of friction of the parts of the film pack which are held in tight contact, each with the next adjacent, by the atmospheric pressure surrounding the pack.

To form the X-ray pack, a sheet of X-ray film 10 is first sandwiched between a pair of fluorescent intensifying screens 11, 12. The sandwich is wrapped with a protective covering 14 and, along with a stiffening element 16 which may have the lead coating 17, is inserted through an opening 21 in an outer flexible bag or pouch 20. The bag 20 and elements contained therein are placed within an evacuating chamber, such as a vacuum box. The box, and hence the bag 20, is evacuated. The open end of the bag 21 is then heat sealed. The thermoplastic, bondable, inner ply 23 of the outer bag 20 facilitates such heat sealing.

For laminography or the like, a plurality of films may be stacked in a single pouch. In this event a layer of sponge 19, FIGURE 6, is interposed between the intensifier screens of adjacent layers to assure intimate contact of the screens and film.

A suitable vacuum box 25 for evacuating the outer bag 20 of the film pack is shown in FIGURE 4 of the drawings. The vacuum box 25 includes a base portion 26 and a lid portion 27. A support surface 28 is located within the base portion 26 of the box 25 and is adapted to support the assembled film pack. Guide bars 29 and 30 position the film pack for proper heat sealing. Openings 31 in the support surface 28 communicate to a vacuum source through a conduit 32 and serve to remove air from above the support surface of the vacuum box 25. A welding unit consisting of two welding jaws 33 and 34 is located within the box 25. One welding jaw 33 is located within the base portion 26 adjacent one side of the box and just below the support surface 28. This welding jaw is mounted for vertical movement by a solenoid WS (shown schematically in FIGURE 5). The other welding jaw 34 is located in the lid portion 27 of the vacuum box adjacent the same side of the box as is the lower jaw. The two jaws 33 and 34 are placed in cooperating relationship when the lid 27 is closed. Resistor elements WR (shown schematically in FIGURE 5) are located within welding jaws 33 and 34 and serve to heat the jaws. A micro-switch SW1 is located in the base portion 26 of the vacuum box 25, and is in a position to be closed by an actuator 36 fastened to the lid portion 27 of the box, whenever the box lid 27 is closed. The mechanisms for actuating the vacuum and welding unit will be described in connection with the control circuit, which is shown in FIGURE 5 of the drawings.

Figure 5:
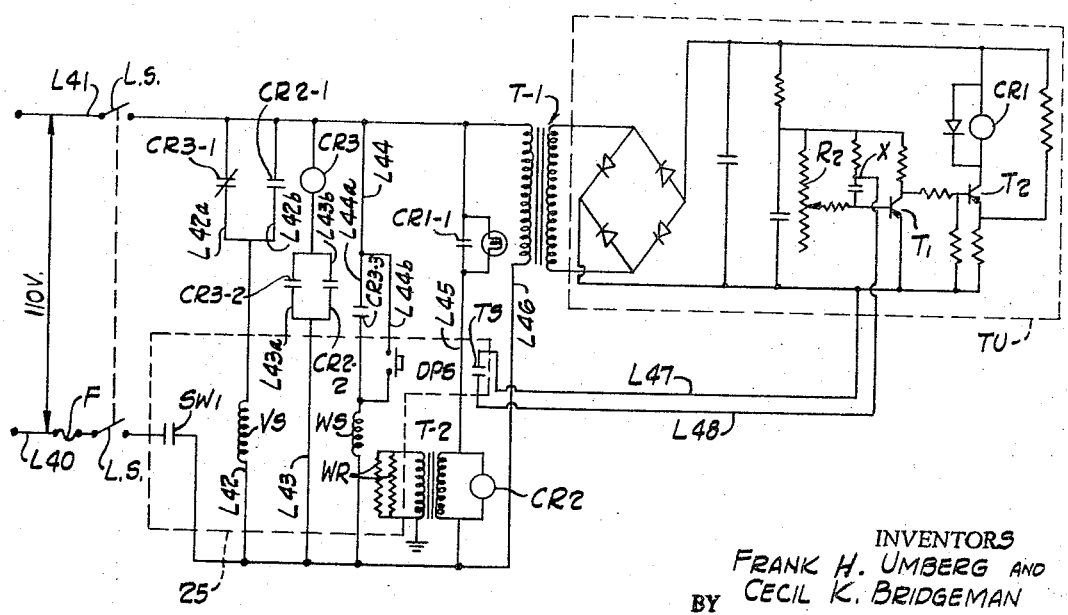
FIGURE 5 is a circuit diagram of the vacuum and heat sealing control for the vacuum box of FIGURE 4.

In the circuit diagram of FIGURE 5, the vacuum box 25 is indicated by dotted lines. Components of the circuit within the dotted line, except contact CR1–1, are physically located within the vacuum box 25. The circuit of a commercially available timer unit TU is also outlined by dotted lines and is connected to the operating circuit of the vacuum box through a transformer T1.

The purpose of the vacuum box is to create a vacuum completely surrounding an unsealed X-ray film pack, and to then heat seal or weld the one open end of the pack so that when the vacuum of the box is released, the pack will remain evacuated. The circuit operates on a 110-volt, 60-cycle single phase electrical supply. This supply is indicated by power lines L40 and L41 in FIGURE 5. A fuse F is located in power line 40 and an on-off line switch LS is in each power line 40 and 41 to prepare the vacuum unit for use.

A vacuum film pack is placed on the support surface 28 of the vacuum box 25, with the open end 21 of the film pack overlying the lower welding jaw 33. The top portion 27 of the vacuum box 25 is closed. The switch actuator 36 closes the micro-switch SW1 in power line L40. A series of circuit lines L42, L43, L44, L45 and L46, and associated sub-circuit lines L42a, L42b, L43a, L43b, L44a, and L44b are connected between the two power lines L40 and L41.

The closing of micro-switch SW1 connects a circuit through lines L42, L42a and normally closed contact CR3–1 to actuate a solenoid VS. The solenoid VS controls a solenoid valve (not shown) that connects a vacuum to the vacuum box 25 via the conduit 32.

As the pressure within the vacuum box 25 decreases, a differential pressure switch DPS in line L44b is closed. This connects a welding unit solenoid WS through lines L44 and L44b. The welding unit solenoid WS closes the welding unit jaws 33 and 34 to close the opening 21 in the outer bag 20 of the now evacuated film pack.

Movement of the welding unit jaw 33 mechanically closes a timer switch TS in the box 25. The switch is connected by two wires L47 and L48 to the timer unit TU. The timer unit TU includes a main contactor relay coil CR1 that will remain actuated for a predetermined time, as set on the timer unit. Briefly, the closing of the switch TS shorts point X of the timer unit to ground. This raises the base potential of the transistor T1, making it switch off. This in turn, lowers the base potential of the transistor T2 to the point where current flows through the coils of relay CR1. The timing period, during which the coil CR1 is energized, is adjustable by the resistor R2.

A normally open relay contact switch CR1–1 is shown in circuit line L45. Physically, the contact CR1–1 is located within the timer unit TU and connected with the control circuit of the vacuum box. The energization of coil CR1 closes normally open contact CR1–1 in line L45, energizing a relay coil CR2 and supplying current to the welding unit resistance heating elements WR, through a transformer T2. The welding resistor elements WR are located within the welding jaws 33 and 34 and cause the thermoplastic inner ply 23 of the bag 20 located between the jaws to become bonded at the bag opening 21.

The energized relay coil CR2 closes a normally open contact CR2–1 in line L42b. This holds the solenoid VS actuated and maintains the vacuum within the vacuum box 25. The coil CR2 also closes a normally open contact CR2–2 in line L43b. This supplies current to the coil of a relay CR3 in circuit line L43.

Energization of the relay coil CR3 opens a normally closed contact CR3–1 in line L42a. It also closes a normally open contact CR3–2 in line L43a, to hold relay coil CR3 energized. Coil CR3 also closes a normally open contact CR3–3 in circuit line L44a to by-pass the differential pressure switch DPS. This maintains the welding jaws 33 and 34 closed to create a forging action upon the heat-sealed opening 21 while the vacuum in the chamber is being released.

At the end of the timing period, as set by the timer unit TU, the relay coil CR1 is de-energized. This opens contact CR1–1 to terminate the welding operation. When contact CR1–1 is opened, relay coil CR2 is de-energized. This opens switch CR2–1 to de-energize the vacuum solenoid VS, reversing the associated valve, and porting the box to atmosphere. Air under atmospheric pressure then enters the vacuum box 25. When the lid portion 27 of the vacuum box is raised, the micro-switch SW1 is opened and the jaw 33 of the welding unit is withdrawn.

The above-described mechanism provides one convenient and effective arrangement for forming the finished film pack of the present invention in accordance with the disclosed method. It should be understood that the specific construction and arrangement of the vacuum box and associated control circuit do not form a part of this invention. For further details concerning the specifically disclosed vacuum box and control circuit for evacuating film packs in the practice of this invention, reference may be had to the copending application of C. K. Bridgeman, Ser. No. 431,590 filed Feb. 10, 1965, and entitled, Vacuum Sealing Unit, which is assigned to the assignee of the present invention and incorporated herein by reference.

While in the foregoing disclosure preferred embodiments of the invention have been disclosed, it will be understood that numerous modifications and alterations may be made therein without departing from the spirit and scope of the invention as set forth in the appended claims.

What is claimed is:

1. An X-ray film pack comprising a sheet of X-ray film, an intensifier screen on each side of the sheet of film, an X-ray transparent wrapping covering the outer surface of each of the intensifier screens, a sheet of cardboard adjacent the wrapping, a lead coating adhered to one surface of the sheet of cardboard, said sheet of cardboard being constructed and arranged in a corrugated configuration to act as a vacuum reservoir, the film, screen and cardboard sheet being similar in length, width and shape, and an outer protective covering surrounding the film, screens, wrapping and cardboard sheet, said covering being X-ray transparent, flexible and essentially empty of gas and constructed of two plys adhered together, an outer ply being highly fluid-impervious and tear-resistant and an inner ply being light-opaque and a thermoplastic bond material.

2. An X-ray film pack comprising a sheet of X-ray film, an intensifier screen on each side of the sheet of film, an X-ray transparent envelope covering the outer surface of each of the intensifier screens, a sheet of corrugated cardboard adjacent the envelope, the film, screens and cardboard being similar in length, width and shape, and an outer protective covering surrounding the film, screens, envelope and cardboard sheet, said covering being light-impervious, X-ray-transparent, fluid-tight and flexible and essentially empty of gas, whereby atmospheric pressure maintains all adjacent parts of the film pack in intimate contact with each other and wherein the cardboard sheet acts as a reservoir for any air within the pack.

3. The film pack of claim 2 wherein the sheet of cardboard has a lead coating adhered to one surface.

4. The film pack of claim 2 wherein the outer protective covering is formed of two plys, an outer ply being highly fluid impervious and tear resistant and an inner ply being light-opaque.

5. An X-ray film pack comprising a two ply outer covering in the form of a bag, an outer one of the plys formed of polyethylene glycol ester of terephthalic acid, and an inner one of the plys formed of black polyethylene bond material which is thermoplastic, stable, inert and capable of being bonded to itself by the application of heat and pressure; a sheet of X-ray film, an intensifier screen on each side of the X-ray film and a polyvinyl chloride wrapping covering the intensifier screens and positioned within the outer covering; and a corrugated cardboard sheet of similar length, width and shape to the sheet of X-ray film and having a coating of lead adhered to one surface thereof; the X-ray film pack being essentially empty of gas, whereby atmospheric pressure maintains all adjacent parts of the film pack in intimate contact with each other.

6. In a method of forming a curved X-ray film pack, the steps comprising inserting a sheet of X-ray film and an intensifier screen in a flexible essentially fluid-impervious bag, curving the bag, film and screen to a desired shape, and evacuating and sealing the bag while maintaining the curved shape, whereby the film pack substantially maintains the desired shape.

7. In a method of forming a curved X-ray film pack, the steps comprising arranging an intensifier screen on each side of a sheet of X-ray film, wrapping the arranged screens and film in a covering, inserting the covering, screens and film in a bag through an opening, curving the bag and inserted elements to a desired shape, evacuating the bag and thereafter heat sealing the opening while maintaining the curved shape, whereby the film pack substantially maintains the desired shape.

8. A curved X-ray film pack comprising an outer covering that is flexible, X-ray-transparent, light-opaque, and fluid-tight; a flexible sheet of X-ray film within the outer covering; and a flexible intensifier screen on each side of the sheet of film; said film pack being curved to have a concave surface and a convex surface and being essentially empty of gas, said concave surface being smaller than the convex surface and all parts of the film pack being maintained in tight intimate relationship by the ambient atmosphere, whereby the pack remains curved.

9. An X-ray film pack comprising: a sheet of X-ray film; an intensifier screen on either side of the film; and an X-ray transparent envelope tightly surrounding the film and screen, said envelope including first and second plies of plastic material one of which is opaque to light, the first ply being thermoplastic, heat bondable and forming the inside surface of the envelope, the second ply being fluid impervious, and the envelope being essentially empty of gas and sealed closed.

10. An X-ray film pack as set forth in claim 9 including a relatively stiff member within the envelope constructed with a cavity of substantially fixed dimensions that acts as a vacuum reservoir so that even in the absence of a complete vacuum the film, screen and envelope are maintained in tight relationship.

11. An X-ray film pack as set forth in claim 9 including an X-ray transparent wrapping about the film and screens and within the envelope, said wrapping serving to hold the film and screen in proper relationship during placement into the envelope.

12. An X-ray film pack as set forth in claim 11 including a member within the wrapping for stiffening the pack, and wherein the wrapping includes a divider to separate the stiffening member from the film and screen to facilitate changing the film while retaining the stiffening member.

13. An X-ray film pack as set forth in claim 12 wherein an intensifying screen is bonded to the wrapping.

14. An X-ray film pack comprising a sheet of X-ray film, an intensifier screen on either side of and in contact with the film, an X-ray transparent wrapping over the film and screen that overlies opposite outer surfaces of the film and screen assembly holding the film and screen together, and a flexible, X-ray transparent, fluid-tight outer envelope tightly surrounding and enclosing the wrapping, film and screen, said envelope being essentially empty of gas.

15. An X-ray film pack as set forth in claim 14 including a member within the wrapping for stiffening the pack, and wherein the wrapping includes a divider to separate the stiffening member from the film and screen to facilitate changing the film while retaining the stiffening member.

16. An X-ray film pack as set forth in claim 15 wherein an intensifying screen is bonded to the wrapping.

17. An X-ray film pack comprising: a sheet of X-ray film, an intensifier screen against the film, a stiffening member of similar length, width and shape to the sheet of film, a flexible, X-ray transparent, fluid-tight envelope essentially empty of gas, tightly surrounding and enclosing the film, screen and stiffening member, and a cavity of essentially fixed dimensions formed of relatively stiff material within the envelope forming a reservoir of substantially constant volume to receive any air that might enter or remain in the envelope, whereby the envelope is maintained in tight surrounding relationship with the film, screen and stiffening member by ambient pressure.

18. An X-ray film pack as set forth in claim 17 wherein the stiffening member is corrugated cardboard and the corrugations form the cavity.

References Cited

UNITED STATES PATENTS

| | | | |
|---|---|---|---|
| 2,590,892 | 4/1952 | Reuter | 250—68 |
| 3,119,015 | 1/1964 | Kollock | 250—68 |
| 3,291,984 | 12/1966 | Wasser | 250—68 |

RALPH G. NILSON, *Primary Examiner.*

A. L. BIRCH, *Assistant Examiner.*